US008123187B2

(12) United States Patent
Vosbikian et al.

(10) Patent No.: US 8,123,187 B2
(45) Date of Patent: Feb. 28, 2012

(54) HEIGHT ADJUSTABLE AND REMOVABLE CONTAINER SYSTEM

(75) Inventors: Peter S. Vosbikian, Moorestown, NJ (US); Robert Petner, Burlington, NJ (US)

(73) Assignee: Zenith Innovation, LLC, Delran, NJ (US)

( * ) Notice: Subject to any disclaimer, the term of this patent is extended or adjusted under 35 U.S.C. 154(b) by 390 days.

(21) Appl. No.: 12/460,698

(22) Filed: Jul. 23, 2009

(65) Prior Publication Data

US 2011/0017757 A1 Jan. 27, 2011

(51) Int. Cl.
*A47H 1/10* (2006.01)

(52) U.S. Cl. ......... 248/318; 248/317; 248/323; 248/327

(58) Field of Classification Search .................. 248/318, 248/317, 323, 327, 333; 362/404; 220/475
See application file for complete search history.

(56) References Cited

U.S. PATENT DOCUMENTS

| | | | | | |
|---|---|---|---|---|---|
| 1,393,078 | A | * | 10/1921 | Butler | 248/343 |
| 1,473,794 | A | * | 11/1923 | Moon | 248/343 |
| 1,484,747 | A | * | 2/1924 | Williamson | 248/343 |
| 1,571,957 | A | * | 2/1926 | Moon | 248/343 |
| 3,711,021 | A | * | 1/1973 | Tantillo | 248/579 |
| 5,052,148 | A | * | 10/1991 | Sharon et al. | 47/67 |
| 5,287,973 | A | * | 2/1994 | Bankier | 211/113 |
| 5,289,796 | A | * | 3/1994 | Armstrong | 119/52.3 |
| 5,312,003 | A | * | 5/1994 | Domenig | 211/144 |
| 5,458,243 | A | * | 10/1995 | McBride | 206/503 |
| 6,253,706 | B1 | * | 7/2001 | Sloop | 119/57.9 |

* cited by examiner

*Primary Examiner* — Amy J. Sterling
(74) *Attorney, Agent, or Firm* — Stuart M. Goldstein

(57) ABSTRACT

A height adjustable and removable container system is provided with a container having a center opening through which at least one elongated, supporting guide member extends. The container moves up and down the guide member and is adjustable to fully raised and fully lowered positions and can also be positioned on intermediate heights on the guide member. A handle is removably connected to the end of the guide member to assist in the movement of the container along the guide member. The handle can be disconnected and separated from the guide member to allow the container to be removed from the system. A stop pin, stored in the handle when not in use, is provided to set the container at intermediate heights on the guide member.

15 Claims, 6 Drawing Sheets

HEIGHT ADJUSTABLE AND REMOVABLE CONTAINER SYSTEM

BACKGROUND OF THE INVENTION

Mounting decorative and functional receptacles to and suspending them from overhead surfaces is a popular and attractive way of displaying planters, bird feeders, lamps, and similar container based items. Whether mounted and hung from an indoor ceiling or outdoors from a roof overhang or a tree, suspended planters, birdfeeders and similar hanging devices provide an appealing and convenient alternative to ground base support of such items.

However, suspended containers present the obvious problem of being out of reach to the normal user who must gain access to the container, e.g. to water or attend to a plant in a suspended planter, to fill a suspended birdfeeder, or maintain a lamp. The use of a step stool to reach elevated containers, while functional, presents the normal hazards which are inherent with standing on a ladder. Moreover, when step stools are not available, the user may attempt to reach the container by alternate, unsafe means. Thus, the removal of a container to attend to its contents and then the replacement of the container in its elevated position is an inconvenient, time consuming, and potentially unsafe process.

The problems associated with suspended, container based items have been recognized by the prior art. For example, U.S. Pat. Nos. 4,187,996, 5,052,148, and 5,065,971 disclose various height adjustable planter systems. However, these and similar systems either operate by means of an inordinate number of moving parts which are susceptible to breakage, are expensive to manufacture, and therefore impractical, or they are unstable and difficult to precisely position. Most are cumbersome to operate as well.

The limitations and disadvantages of existing, suspended containers are largely addressed in U.S. Pat. No. 8,047,495, which discloses a unique, effective, and efficient height adjustable container system. However, that system does not relate to removal of the container from the suspended system, to setting the container at a variety of heights on the system, and other important functions.

SUMMARY OF THE INVENTION

It is thus the object of the present invention to provide a height adjustable and removable container system which not only overcomes the limitations and disadvantages of prior container suspension systems, but also provides for additional versatility to the system disclosed in the above referenced application.

It is the object of the present invention to provide a height adjustable and removable container system which provides quick and easy access to a suspended planter, bird feeder, lamp component or similar container-based item.

It is another object of the present invention to provide a height adjustable and removable container system which has a rigid suspended support element for maintaining the container precisely in the desired stationary elevated and lowered positions.

It is a further object of the present invention to provide a height adjustable and removable container system which allows the suspended container of this system to be raised and lowered with minimal effort.

It is still another object of the present invention to provide a height adjustable and removable container system which allows the suspended container of this system to be lowered simply by pushing a button on the inner supporting member on which the container is suspended, thus allowing the user to lower the container.

It is another object of the present invention to provide a height adjustable and removable container system which allows the suspended container of this system to be raised simply by pushing the container up along its inner supporting member.

It is a further object of the present invention to provide a height adjustable and removable container system whose up and down operation constitutes a safe and efficient means of vertically raising and lowering the container.

It is still another object of the present invention to provide a height adjustable and removable container system which allows the suspended container to be positioned at intermediate heights of the system.

It is a further object of the present invention to provide a height adjustable and removable container system which allows the suspended container to be removed and separated from the system.

It is another object of the present invention to provide a height adjustable and removable container system which allows the suspended container to be easily rotated while being suspended.

It is still another object of the present invention to provide a height adjustable and removable container system which is easy and enjoyable to operate.

It is a further object of the present invention to provide a height adjustable and removable container system which is simply and attractively mountable to an overhead surface to maintain the container in a relative immovable vertical position.

These and other objects are accomplished by the present invention, a height adjustable and removable container system which comprises a container having a center opening through which at least one elongated, supporting guide member extends. The container moves up and down the guide member and is adjustable to fully raised and fully lowered positions and can also be positioned on intermediate heights on the guide member. A handle is removably connected to the end of the guide member to assist in the movement of the container along the guide member. The handle can be disconnected and separated from the guide member to allow the container to be removed from the system. A stop pin, stored in the handle when not in use, is provided to set the container at intermediate heights on the guide member.

The novel features which are considered as characteristic of the invention are set forth in particular in the appended claims. The invention, itself, however, both as to its design, construction and use, together with additional features and advantages thereof, are best understood upon review of the following detailed description with reference to the accompanying drawings.

DETAILED DESCRIPTION OF THE INVENTION

Figure 1:
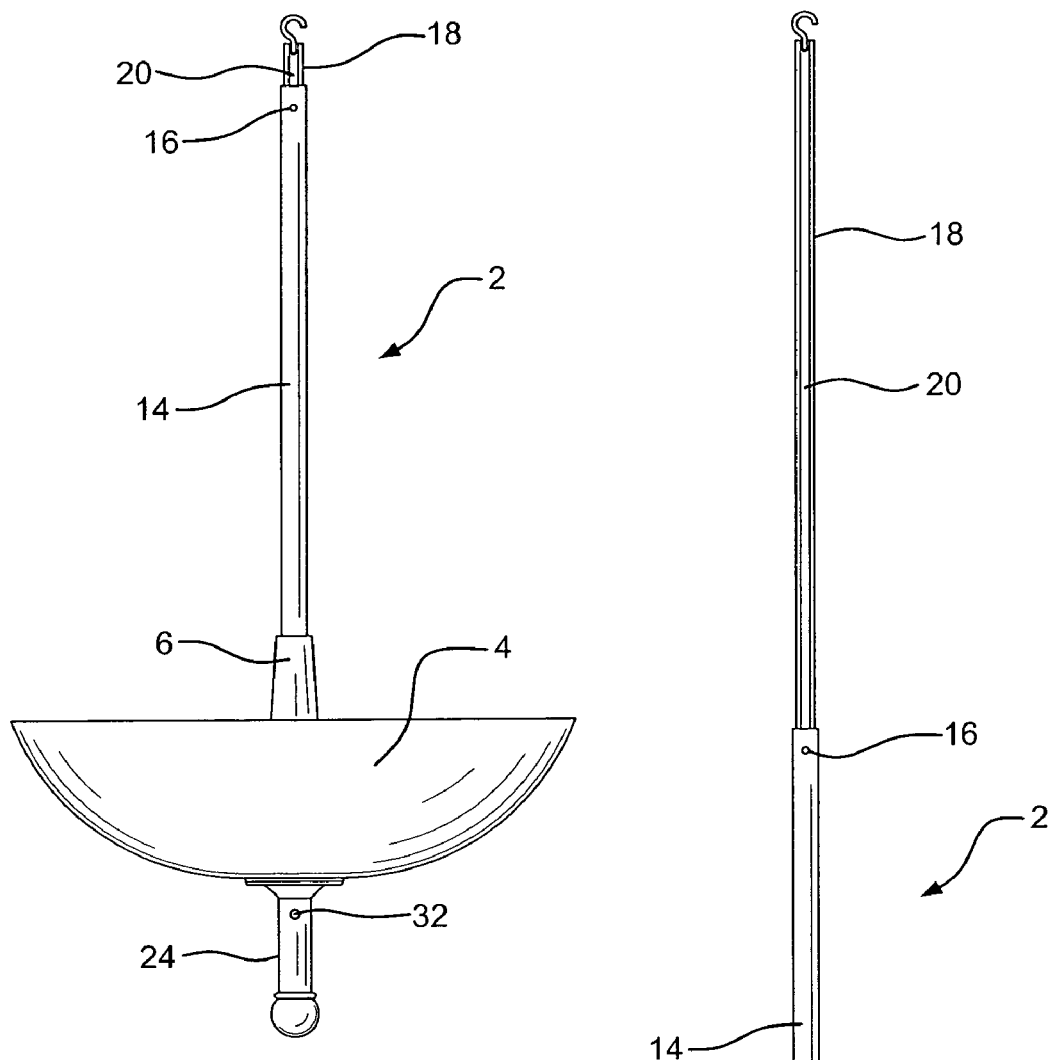
FIG. 1. is an elevation view of the height adjustable and removable container system of the present invention with its container in the fully raised position.
Figure 2:
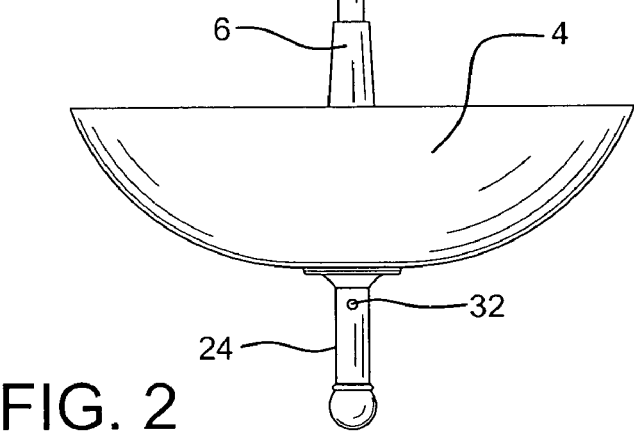
FIG. 2 is an elevation view of the height adjustable and removable container system of the present invention with its container in the fully lowered position.
Figure 3:
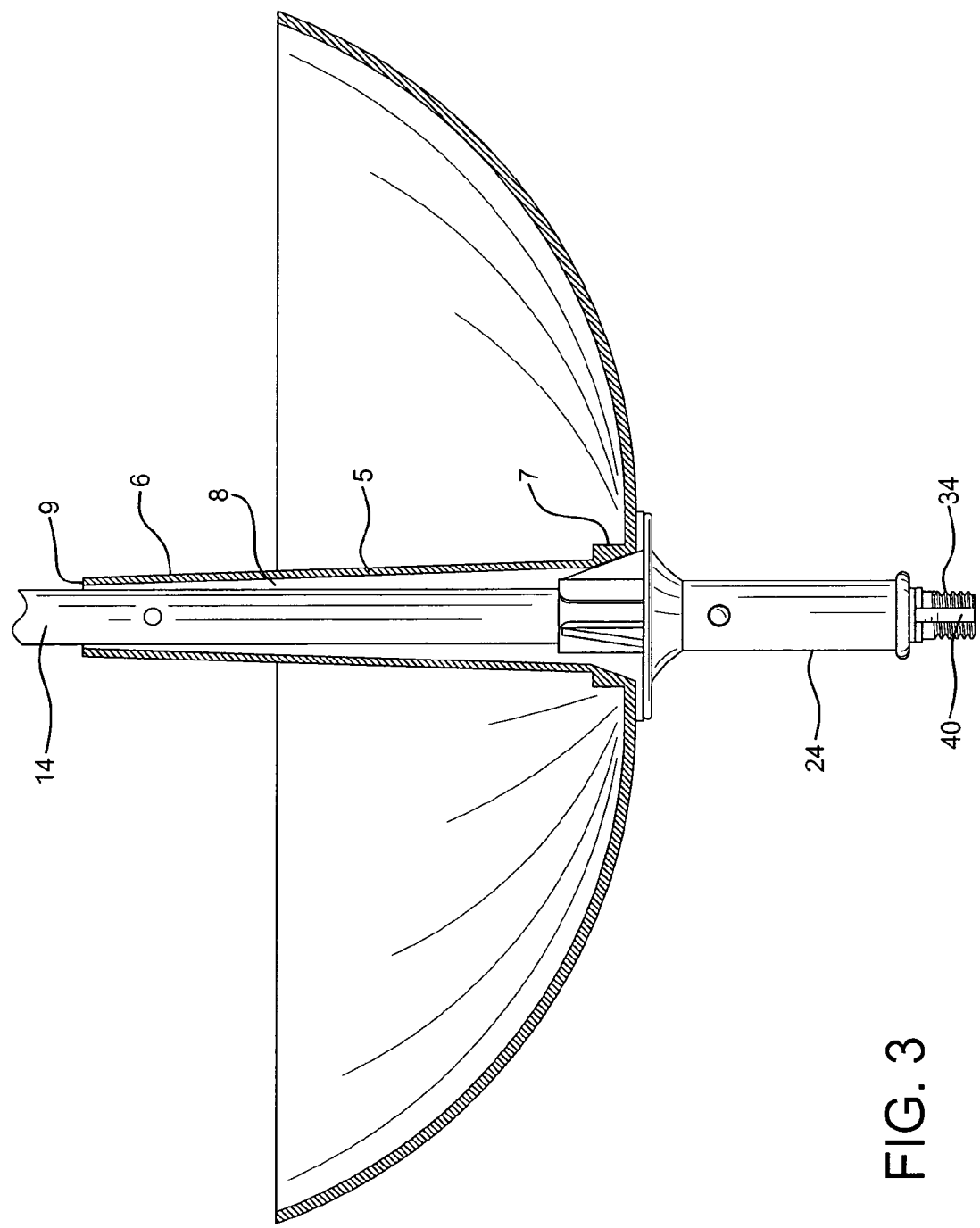
FIG. 3 is a partial cross-sectional view of the height adjustable and removable container system of the present invention depicting the position of the control handle while supporting the container.

FIGS. 1 and 2 show height adjustable and removal container system 2 with its container 4 in the fully raised (FIG. 1) and fully lowered (FIG. 2) positions. Container 4 in this embodiment is bunt-shaped, with upstanding central tubular element 6 and center through opening 8 (FIG. 3). The shape and type of container is not to be considered so restrictive, as many different containers can be used for the various uses contemplated for the invention, e.g. for planters, bird feeders, lighting components, etc.

Outer supporting guide member 14 is positioned within tubular element 6 and center opening 8 of container 4. Stop element 16 extends into the interior of outer member 14. Stop element 16 can take the form of a screw, bolt, key, or similar structure. Inner supporting guide member 18 is positioned within outer member 14. Inner member 18 comprises elongated slot or channel 20. Inner member 18 is positioned within outer member 14 such that stop element 16 is slideable disposed within slot or channel 20. In this manner, outer member 14 is vertically slideable over inner member 18 from a retracted position, wherein container 4 is in its fully raised position (FIG. 1), to an expanded position wherein the container is in its fully lowered position (FIG. 2). The design and operation of this system is described further in U.S. Pat. No. 8,047,495, the subject matter of which is incorporated herein.

Figure 5:
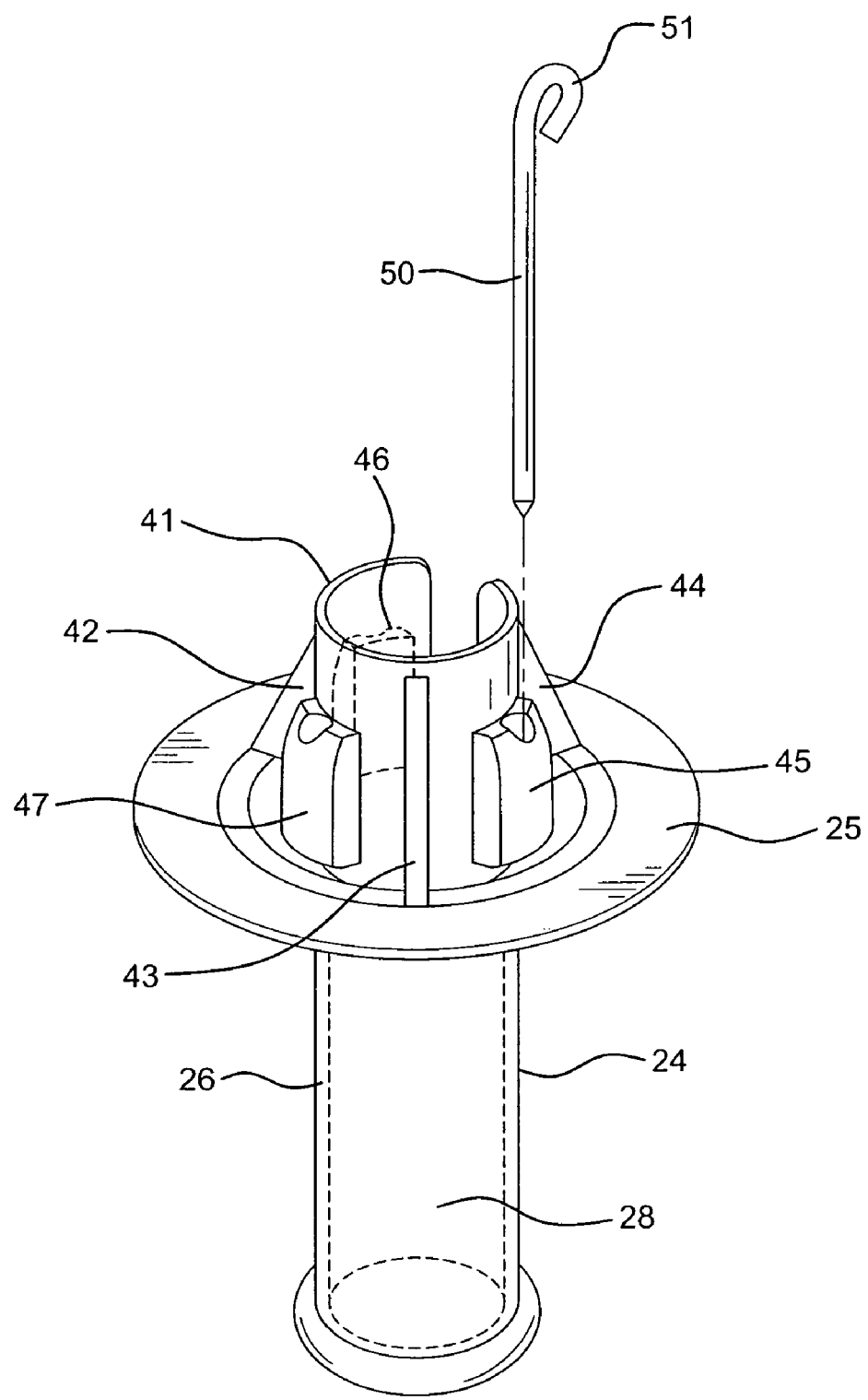
FIG. 5 is an isometric view of the control handle of the height adjustable and removable container system of the present invention with stop pin.

Control handle 24 serves to support container 4 in both its fully raised position (FIG. 1) and fully lowered position (FIG. 2). As best seen in FIG. 5, handle 24 comprises a unitary body 26 with through channel 28. Through hole 30 in unitary body 26 is aligned to receive push button 32 when container 4 is in its fully raised position. Button 32 is normally biased outward by an internal spring located within inner member 18, as more fully described in co-pending application Ser. No. 12/381,346. When button 32 is pressed, both handle 24 and container 4, which is being supported by the handle, are free to slid down inner member 18 to the lowered position shown in FIG. 2.

Figure 6:
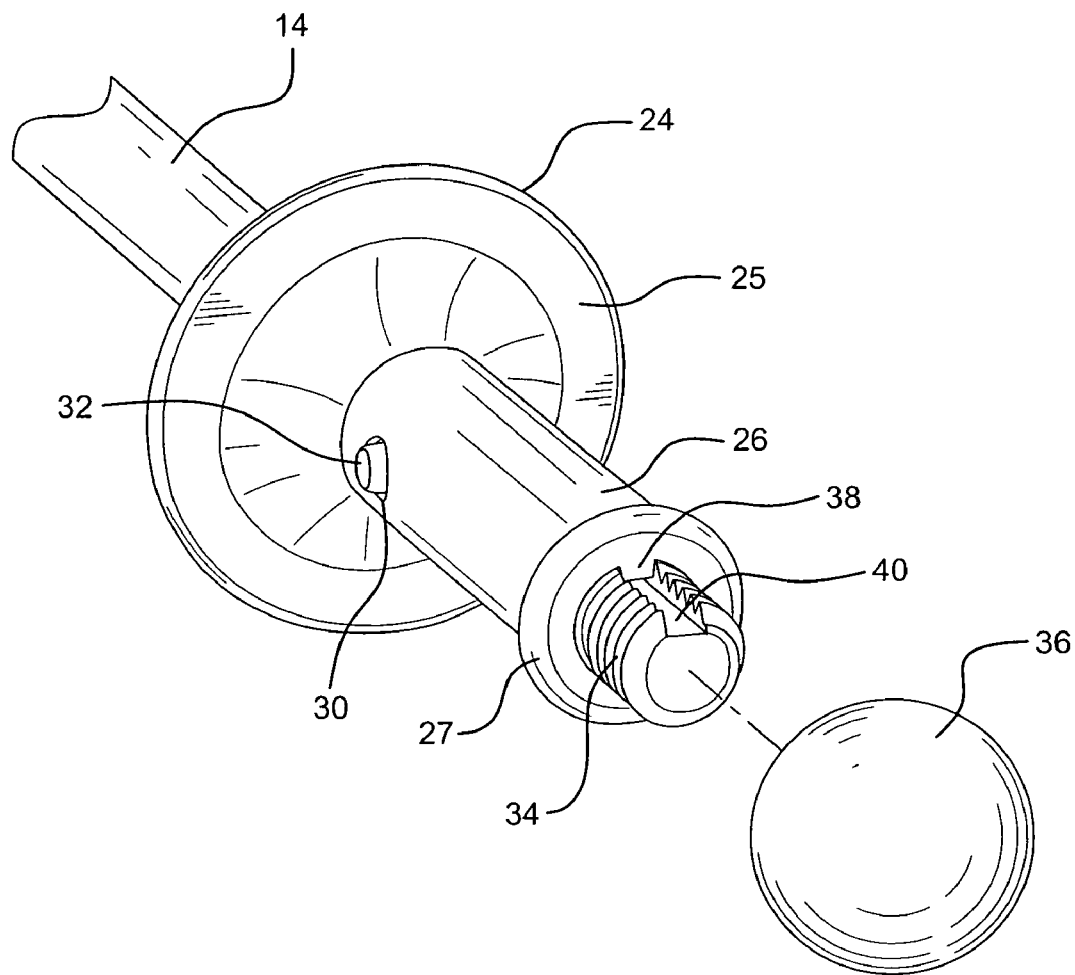
FIG. 6 is an isometric end view of components of the height adjustable and removable container system of the present invention.

Handle 24 is normally positioned over the lower end section 15 of outer member 14, this lower end of outer member 14 being configured to be positioned within through channel 28 of handle 24. The distal end of lower end section 15 of outer member 14 has threads 34. Handle 24 is positioned over lower end section 15 of outer member 14 and slid up over threads 34. It is then secured over lower end section 15 by threaded pommel 36 (FIG. 6).

Figure 7:
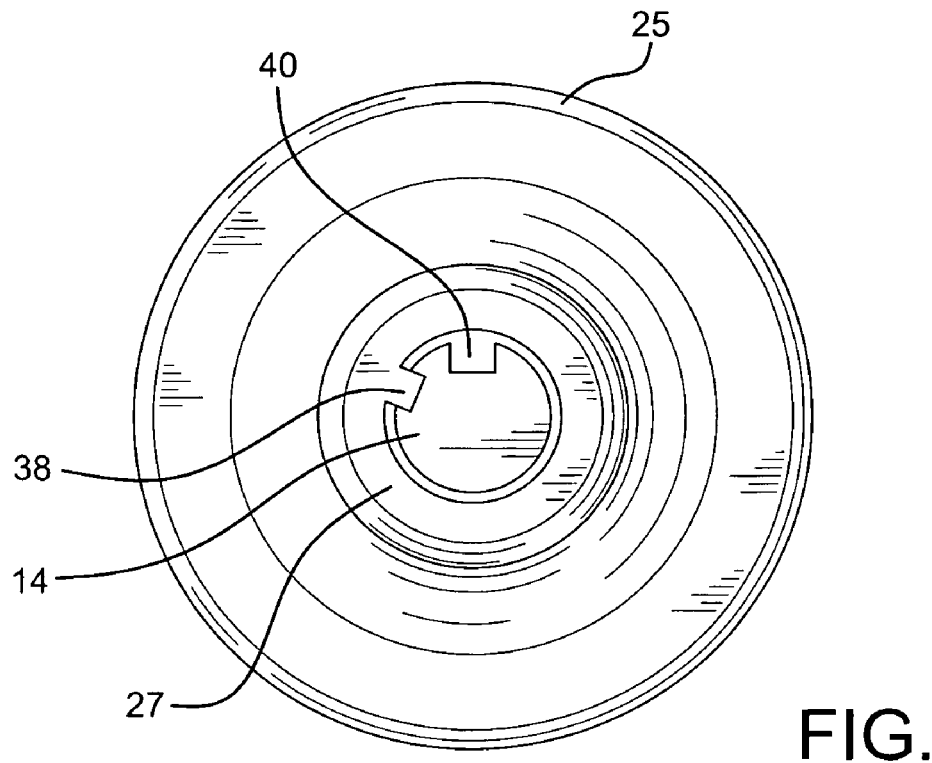
FIG. 7 is a rear end view of the height adjustable and removable container system of the present invention depicting the operation of its keyway system.
Figure 8:
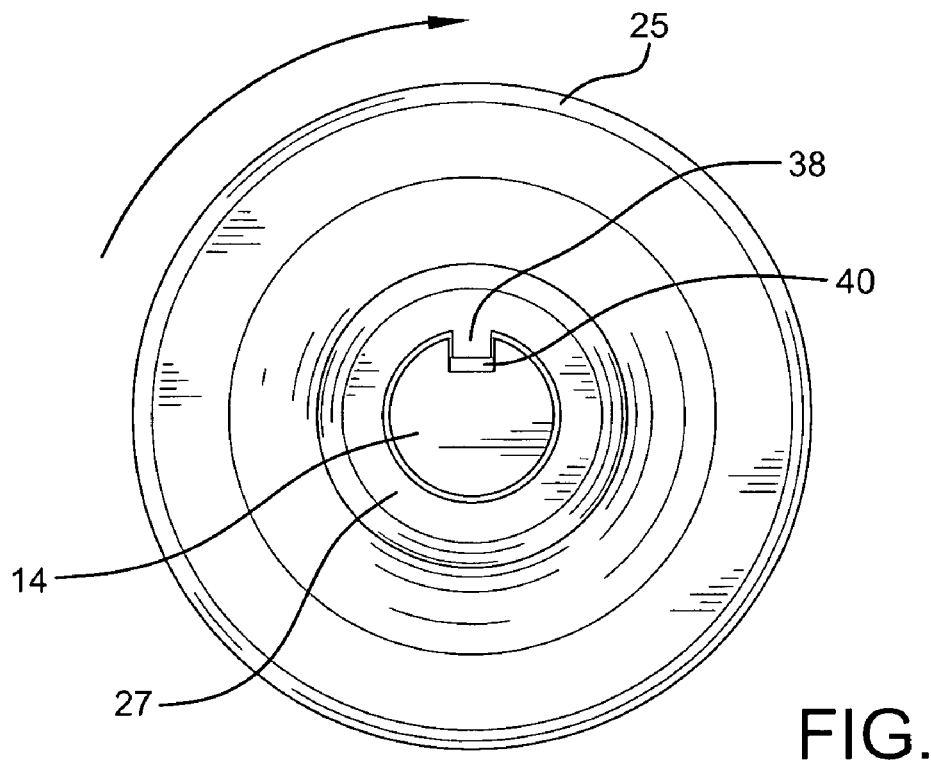
FIG. 8 is an end view similar to FIG. 7, depicting the keyway system in locked position.

It is important that handle 24 be aligned properly on outer member 14, in order to ensure that its through hole 30 can receive button 32 when the handle and container are slid to their fully raised position. This is accomplished by the presence of key 38 located at lower section 27 of handle 24. A corresponding keyway 40 is located through threads 34 at the distal end of lower end section 15 of outer member 14. As shown in FIGS. 6-8, when handle 24 is slid onto lower end section 15, it is simply rotated until key 38 enters keyway 40. This locks handle 24 in properly aligned position on outer member 14. Pommel 36 can then be screwed onto threads 34 to secure handle 24 in position on outer member 14.

As best shown in FIG. 5, handle 24 further comprises upper section 41 having spline members 42, 43, and 44, which are tapered from the top of the handle to support platform 25. Pin socket receptacles 45, 46, and 47 are located on support platform 25 as well. The socket receptacles are configured to store stop pin 50 when the pin is not in use.

Figure 4:
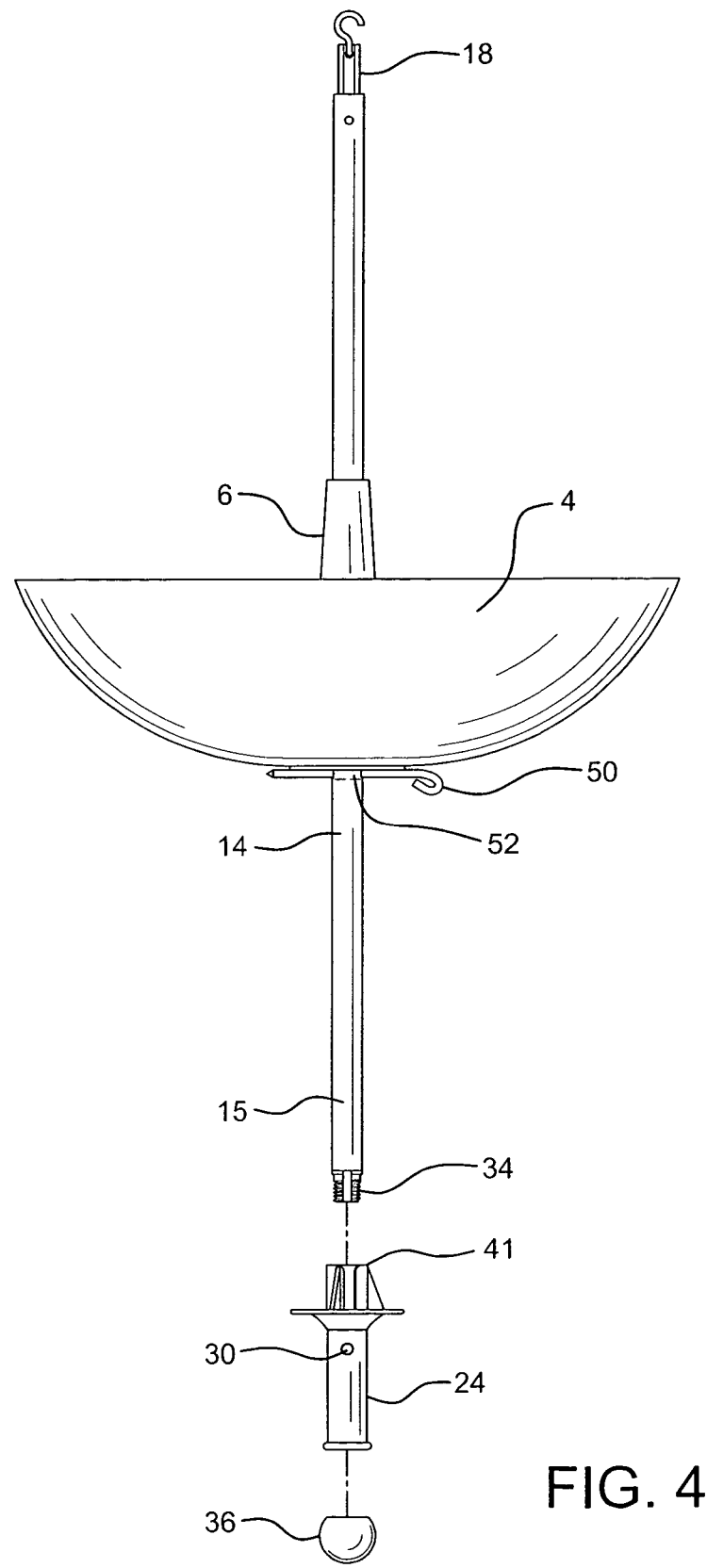
FIG. 4 is a partially exploded elevation view of the components of the height adjustable and removable container system of the present invention.

Stop pin 50 permits container 4 to be adjusted to various heights between its fully raised and lowered positions. From the fully lowered position shown in FIG. 2, container 4 can be slid off handle 24 and up outer member 14, until it is just above opening 52 which extends through the outer member. Stop pin is simply removed from one of the socket receptacles, e.g. receptacle 45, and inserted through opening 52, thereby maintaining container 4 on outer member 14 at the height of the opening (FIG. 4). It is contemplated that several through openings at different heights along outer member 14 can be provided in order to allow the user the option of positioning container 4 at these different heights.

The use of stop pin 50 through outer member 14 also allows easy and safe removal and separation of container 4 from the outer member. When it is desired to remove container 4, for instance when the container is a planter and it is necessary to maintain or water its plants in another location, the container is first slid up outer member 14 and retained in that raised position by stop pin 50 through opening 52, as previously described and shown in FIG. 4. Pommel 36 is unscrewed from threads 34 on outer member 14. Handle 24 is then slid off the outer member. Stop pin 50 is removed from opening 52. Container 4 is now free to slide down and off outer member 14. The reverse process is employed when container 4 subsequently is to be reinstalled to the system. It is slid up outer member 14 and retained by stop pin 50 through opening 52. Handle 24 is then resecured by pommel 36 to lower end section 15 of outer member 14 and stop pin 50 is removed from opening 52 and returned to one of the pin socket receptacles, e.g. receptacle 45. Now container 4 can be slid down the outer member to again rest on support platform 25 of the handle.

Smooth insertion and stability of handle 24 into center opening 8 of container 4 is accomplished by the tapered nature of wall 5 at the bottom of the container. As seen in FIG. 3, wall 5 is wider at its very bottom 7 than at its top 9. Spline members 42, 43, and 44 of handle 24 are correspondingly tapered to allow ready interaction between the handle and container 4, as the container is slid down over the spline members. Tapered walls 5 also serve to rotate handle portion 51 of stop member 50 inward, flush against the surface of outer member 14, when the stop member is stored within one of receptacles 45, 46, and 47 and container 4 is being slid over handle 24.

Thus the height adjustable and removal container system of the present invention allows for increased versatility in such systems. Containers employed with the present system can be adjusted to fully raised and fully lowered positions and can also be retained at intermediate positions, as desired by the user. The system of the present invention also permits quick, easy, and safe removal and reinstallation of the container of the system. When used as a planter, the system permits container 4 to be readily rotated about outer member 14, so that all sides of flowers and other plants in the container can receive equal sunlight.

Certain novel features and components of this invention are disclosed in detail in order to make the invention clear in at least one form thereof. However, it is to be clearly understood that the invention as disclosed is not necessarily limited to the exact form and details as disclosed, since it is apparent that various modifications and changes may be made without departing from the spirit of the invention.

The invention claimed is:

1. A height adjustable and removable container system comprising:
   a container having a center opening extending therethrough;
   elongated, vertically positioned container guide means extending through the center opening, the guide means supporting the container for up and down movement of the container thereon, the container being adjustable to a fully raised position on the guide means, to a fully lowered position on the guide means, and to intermediate positions on the guide means;
   a handle comprising an open top, an open bottom and a through channel therebetween;
   means to removably connect the handle to the guide means, whereby when the handle is disconnected from the guide means, the container can be completely slid off and removed from the guide means;
   stop means to maintain the container on the guide means in the intermediate positions, whereby when the container is in either its fully raised position or its fully lowered position on the guide means the handle is directly below and supports the container, and when the container is in an intermediate position on the guide means the stop means is directly below and supports the container; and
   alignment means to direct the handle to a pre-determined position on the end of the guide means.

2. The height adjustable and removable container system as in claim 1 wherein the alignment means comprises a key in the handle configured to engage a keyway at the end of the guide means.

3. The height adjustable and removable container system as in claim 1 wherein the handle further comprises means to store the stop means thereon.

4. The height adjustable and removable container system as in claim 3 wherein the means to store comprises at least one socket receptacle.

5. The height adjustable and removable container system as in claim 1 wherein the stop means comprises a removable pin insertable into the handle for storage or into the guide means to maintain the container on the guide means.

6. The height adjustable and removable container system as in claim 1 wherein the means to removably connect the handle comprises a threaded pommel configured to be threadably engaged with threads on the end of the guide means.

7. A height adjustable and removable container system comprising:
   a container having a center opening extending therethrough;
   elongated, vertically positioned container guide means extending through the center opening, the guide means supporting the container for up and down movement of the container thereon, the container being adjustable to a fully raised position on the guide means, to a fully lowered position on the guide means, and to intermediate positions on the guide means;
   a handle comprising an open top, an open bottom and a through channel therebetween;
   means to removably connect the handle to the guide means, whereby when the handle is disconnected from the guide means, the container can be completely slid off and removed from the guide means;
   stop means to maintain the container on the guide means in the intermediate positions, whereby when the container is in either its fully raised position or its fully lowered position on the guide means the handle is directly below and supports the container, and when the container is in an intermediate position on the guide means the stop means is directly below and supports the container; and
   spline means on the handle to guide said handle into the center opening of the container.

8. The height adjustable and removable container system as in claim 7 wherein the container comprises tapered walls at the bottom of said center opening for receiving the spline means and the stop means, when the container is in its fully raised or fully lowered position.

9. A height adjustable and removable container system comprising:
   a container having a center opening extending therethrough;
   elongated, vertically positioned container guide means extending through the center opening, the guide means supporting the container for up and down movement of the container thereon, the container being adjustable to a fully raised position on the guide means, to a fully lowered position on the guide means, and to intermediate positions on the guide means, said guide means having a threaded connection at one of its ends;
   a handle comprising an open top, an open bottom and a through channel therebetween, a spline means to guide the handle into the center opening of the container;
   a threaded pommel configured to threadably engage the threaded connection of the guide means to maintain the handle on the guide means and to permit the handle to be disconnected from the guide means, allowing the container to be completely slid off of and removed from the guide means; and
   stop means insertable into the handle for storage or into the guide means to maintain the container on the guide means in the intermediate positions, whereby when the container is in either its fully raised position or its fully lowered position on the guide means the handle is directly below and supports the container, and when the container is in an intermediate position on the guide means the stop means is directly below and supports the container.

10. The height adjustable and removable container system as in claim 9 further comprising alignment means to direct the control handle to a pre-determined position on the end of the guide means.

11. The height adjustable and removable container system as in claim 10 wherein the alignment means comprises a key in the handle configured to engage a keyway at the end of the guide means.

12. The height adjustable and removable container system as in claim 1 wherein the handle further comprises means to store the stop means.

13. The height adjustable and removable container system as in claim 12 wherein the means to store comprises at least one socket receptacle.

14. The height adjustable and removable container system as in claim 9 wherein the stop means comprises a removable pin.

15. The height adjustable and removable container system as in claim 9 wherein the container comprises tapered walls at the bottom of said center opening for receiving the spline means and the stop means, when the container is in its fully raised position or fully lowered position.

* * * * *